INVENTOR.
MINORU SUZUKI
BY Stanley Wolder
ATTORNEY

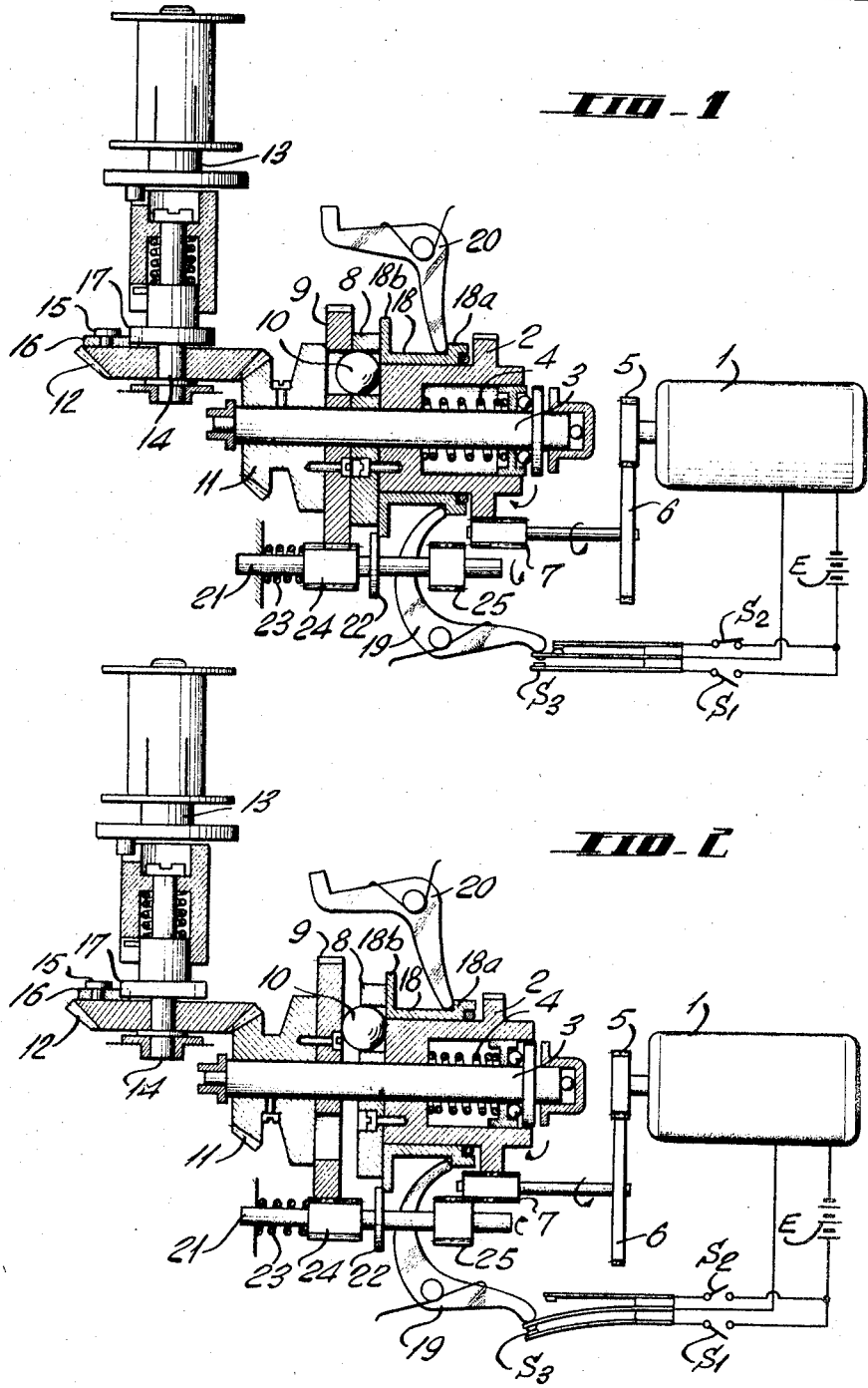

United States Patent Office 3,448,669
Patented June 10, 1969

3,448,669
AUTOMATIC FILM WINDING ARRANGEMENT OF PHOTOGRAPHIC CAMERA
Minoru Suzuki, Tokyo-to, Japan, assignor to Asahi Kogaku Kogyo Kabushiki Kaisha, Tokyo-to, Japan
Filed Aug. 3, 1966, Ser. No. 570,067
Claims priority, application Japan, Aug. 27, 1965, 40/51,974
Int. Cl. G03b *19/04*
U.S. Cl. 95—31     7 Claims

ABSTRACT OF THE DISCLOSURE

A camera film take-up includes a take-up spool connected through tandem coupled overrunning clutch and slipping clutch to an electric motor controlled by a switch. Upon advance of a film frame the clutch slips to close the switch and actuate a transmission connecting the overrunning clutch to the motor in a reverse drive direction to relieve the film tension. Upon return of the slipping clutch to its drive condition the motor control switch is opened.

The present invention relates generally to improvements in photographic cameras and it relates more particularly to an improved camera film advancing mechanism.

In advancing of winding the film in a photographic camera, it is necessary not only to precision wind a predetermined length of film, but also to relax the film after completion of the winding operation. Generally the shutter charging or cocking operation is effected concurrently with and motivated by a film winding operation. If the shutter cocking mechanism remains in an energized or tensioned state consequent to film winding operation, it is possible that the subsequent shutter release and operation sequence may not be smoothly or optimumly achieved. Further, if the film remains in a highly tensioned condition after film winding operation, the flatness of the photosensitive surface of the film is apt to be disturbed, thereby interfering with the satisfactory exposure of the film.

In conventional automatic film winding arrangement using a motor, etc. the driving power is transmitted by a cam coupling arrangement, and upon completion of advance of the film of predetermined length, the driving portion is disengaged from the film winding shaft so that film winding operation is automatically stopped and the film is then relaxed from the tensioned state. Such cam coupling arrangement is provided, however, with a highly complicated operation-controlling cam surface configuration which is difficult and expensive to produce and further, the machining accuracy greatly affects the torque of the power transmission.

It is therefore a principal object of the present invention to provide an improved photographic camera.

Another object of the present invention is to provide an improved film advancing mechanism for photographic camera.

Still another object of the present invention is to provide an improved mechanism for advancing the film in a camera a frame or predetermined increment and effecting the relaxation of the advanced film and the associated shutter cocking mechanisms prior to the release of the shutter.

A further object of the present invention is to provide an improved electric motor driven film advancing mechanism. Still a further object of the present invention is to provide a film advancing mechanism of the above nature characterized by its ruggedness, reliability, adaptability and low cost.

The above and other objects of the present invention will become apparent from a reading of the following description taken in conjunction with the accompanying drawings, wherein FIGURE 1 is a longitudinal sectional view of a film advancing mechanism embodying the present invention and illustrated in a film advancing condition;

FIGURE 2 is a view similar to FIGURE 1, the mechanism being illustrated in a film advancing condition;

Figure 3:
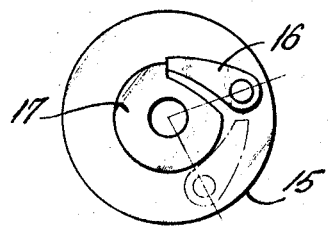
FIGURE 3 is a plan view of the pawl and ratchet type overrunning clutch formerly part of the film advancing mechanism.

In a sense the present invention contemplates the provision of a film advancing mechanism comprising a rotatable film take-up member, a drive member, means including a slip clutch coupling said drive member and means responsive to the condition of said slip clutch for relieving the torque on said take-up member. According to a preferred form of the present mechanism, the slip clutch includes relatively axially movable rotatable plates spring urged toward each other and having confronting recesses releasably engaged by a coupling ball so that upon slipping between the plates the ball leaves one of the recesses and separates the clutch plates. The take-up member is driven through an overrunning clutch and a gear transmission is shifted into engagement between the overrunning clutch drive section and said drive member upon separation of the slipping clutch plates to reverse drive the overrunning clutch drive member and thereby effect the uncoupling of the film take-up member.

Referring now to the drawings and particularly FIGURES 1 to 3 and 5 thereof which illustrate a preferred embodiment of the present invention, a driving motor 1 is provided with a power supply selectively operable energizing or circuit comprising a manual switch $S_1$, and an automatic energizing or power supply circuit controlled by a switch $S_2$ which is automatically closed in synchronism with the camera shutter closure, for example in synchronism with the mirror swing-down movement of a single lens reflex camera. Current is supplied to either of the above two circuits from a battery E, and a switch-over operation between these two circuits is automatically effected by means of a change-over switch $S_3$ in the manner hereinafter described.

A drive gear member 2 is so mounted on a shaft 3 that it is rotatable and also axially displacable along the shaft. The drive gear member 2 is normally urged toward the left as viewed in FIG. 1, by a spring 4 and is coupled through a gear train including gears 5, 6 and 7 to the motor 1. Secured to one end portion of the gear member 2 is a drive plate 8 which normally engages a driven plate 9 through a ball-slip coupling arrangement including a steel ball 10. The drive plate 8 and the driven plate 9 are provided with circular openings or recesses 8a and 9a respectively which releasably engage the ball 10 when in registry.

Fixed to the plate 9 is a bevel gear 11 which is rotatable with the plate 9 about the shaft 3. A bevel gear 12 engages the bevel gear 11 and is coupled through a pawl and ratchet type overrunning clutch 15 as shown in FIG. 3, to a coupling shaft 14 of a film winding shaft or take-up member 13. The overrunning clutch 15 includes a pawl 16 pivoted on the bevel gear 12 and spring urged in counterclockwise direction, as viewed in FIG. 3, into engagement with a ratchet wheel 17 secured to the coupling shaft 14.

A ring member 18 is secured to the drive gear member 2 as is the driving plate 8. One end of the ring member 18 is provided with a stepped portion 18a, while the other end portion thereof terminates in a flange 18b. One end of a switch lever 19 and also one end of a release lever 20, both levers being pivoted to the camera casing, normally abut against the inner shoulder of the stepped portion 18a. The other end of the switch lever 19 is positioned adjacent to the movable arm of the change-over switch $S_3$, while the other end of the release lever 20 is to be manually operated to effect the shutter release.

A contact ring 22 secured to an axially displaceable shaft 21 is urged by a spring 23 into engagement with the flange 18b, thereby to control the displacement of the shaft 21. Also secured to the shaft 21 is a gear 24 engaging the peripheral gear portion of the plate 9, and a gear 25 which is brought into engagement with the coupling gear 7 between the drive gear member 2 and the motor 1 when the shaft 21 is displaced to the right, as viewed in FIG. 1, as will be hereinafter described.

Figure 4:
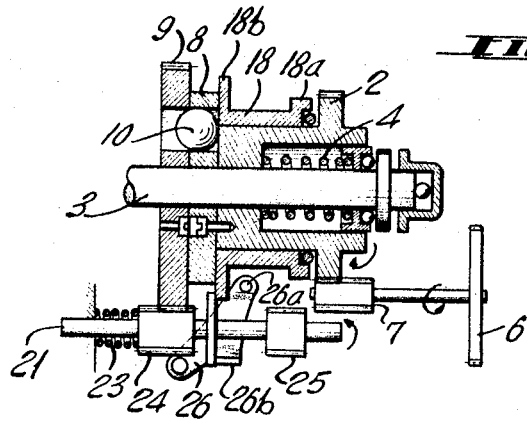
FIGURE 4 is a fragmentary view similar to FIGURE 1 of another embodiment of the present invention.
Figure 5:
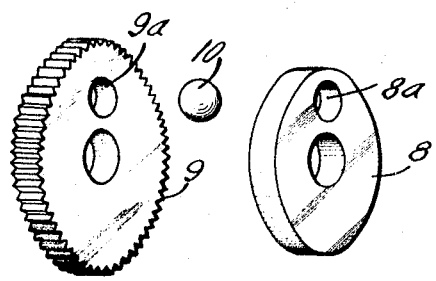
FIGURE 5 is an exploded perspective view of the slipping clutch forming part of the improved mechanism.

In the embodiment of the present invention illustrated in FIG. 4, in order to control the time when the gear 25 engages the gear 7, a lever 26 is so arranged between the flange 18b and the contact ring 22 that the flange 18b, in moving to the right, abuts against the pin 26a and causes clockwise rotation of the lever 26. Such movement of the lever 26 disengages the contact ring 22 from the engaging portion 26b, thus permitting displacement of the shaft 21 when the flange 18b reaches a position which is near to the end of its travel and finally causing the gear 25 to engage the coupling gear 7.

In FIG. 1 the take-up mechanism is in a film winding condition with the lever 19 in such a position as to set the switch $S_3$ to close the automatic energizing circuit of the motor 1. The switch $S_2$ in this circuit has been closed by the shutter release operation, such as swing-down movement of the mirror of a single lens reflex camera. Thus the motor 6 rotates and is energized through the coupling gears 5, 6, and 7 drives the gear member 2. Under this condition the steel ball 10 between the driving plate 8 and the plate 9 is in registry with the holes 8a and 9a so that the ball-slip coupling arrangement, consisting of the driving plate 8, the plate 9 and the steel ball 10, is in a coupled condition. Therefore, the gear member 2, through the plate 9, the bevel gears 11 and 12 and the overrunning clutch arrangement 15, drives the winding shaft 13, thus advancing and winding the film.

When a film length corresponding to one frame has been wound, the stopping of film transportation in the known manner exerts a strain on the plate 9 which in turn causes a ball-slip action between the driving plate 8 and the plate 9, so that transmission of the driving power to the film winding shaft 13 is halted.

Upon this ball-slip action, the steel ball 10 emerging from the hole 9a of the plate 9 causes the driving plate 8 to be moved to the right, as seen in FIG. 1, against the action of the spring 4. This displacement of the plate 8 causes the simultaneous movement to the right of the integral gear member 2 and of the ring member 18, so that the displaceable shaft 21 moves to the right on FIG. 1, which displaceable shaft 21 has been prevented from moving under the influence of the spring 23 since the contact ring 22 has been in abutment against the flange 18b of the ring member 18. Thus, with the gear 24 fixed to the shaft 21 remaining in mesh with the peripheral teeth of the plate 9, the gear 25 fixed also to the shaft 21 is brought into engagement with the gear 7. As a result, the driving power of the motor 1, which has been transmitted to the plate 9 through the driving gear member 2 and the driving plate 8, is now transmitted to the plate 9 through the displaceable shaft 21, thus causing a reverse rotation of the plate 9.

Moreover, the movement of the ring member 18 causes the switch lever 19 and the release lever 20 to be swung, one end of each of which levers 19 and 20 engages the stepped portion 18a of the ring member 18. Thus the switch lever 19 is swung in a clockwise direction to operate the switch $S_3$ to the position shown in FIG. 2 whereby the hitherto automatic power supply circuit of the motor 1 is changed over to the manual power supply circuit.

Then, if the switch $S_1$ is in closed condition due to its manual operation, the motor 1 is energized and the plate 9, which is in a condition of reverse rotation, as heretofore explained, is now suddenly driven in a direction which is reverse to the film winding direction.

Due to the pawl and ratchet arrangement 15 between the bevel gear 12 and the coupling shaft 14, however, the reverse driving power is not transmitted directly to the film winding shaft 13. When in the reverse rotation the pawl 16 reaches the position as indicated in dot-and-dash line relative to the ratchet wheel 17 in the position occupied by same when the film winding operation has been completed, the steel ball 10 drops into the hole 9a because of the movements of the plate 8 and the plate 9 relative to each other, the directions of the movements being opposite to each other. Thus the ball-slip coupling arrangement returns to its original condition.

Due to the slip-movement of the overrunning clutch arrangement 15 because of the reverse drive, the film winding shaft 13 is relaxed from the film winding tension so that the film is retained under a proper tension and also the shutter charge of cocking arrangement driven by the film winding operation is relaxed from the tension. The swinging movement of the release lever 20, due to the returning movement of the plate 8 and the plate 9, actuates the shutter release. Thus the components of the camera perform a very smoth release operation because they have been relaxed from excessive tension so that a proper photographing operation is effected.

Upon return movement of the plate 8 and the plate 9, simultaneously with the operation of the release lever 20, the switch lever 19 is swung counterclockwise. Therefore, the switch $S_3$ is so operated that the manual power supply circuit is changed over to the automatic power supply circuit. This automatic power supply circuit is closed by actuation of the switch $S_2$ when the shutter release operation is terminated, such actuation being performed for example due to the mirror swing-down movement of a single lens reflex camera. Thus, during shutter release operation the motor 1 is not in operation so that the release operation is not disturbed and upon completion of shutter release operation the film winding operation is immediately started as indicated above.

In the embodiment of the present invention shown in FIG. 4, upon completion of film winding operation and start of ball-slip operation through the steel ball 10, the moving driving plate 8 causes the flange 18b of the ring member 18 to push one end of the lever 26 so as to swing this lever 26 in a clockwise direction against the swinging urge. At the end of this operation, the engaging portion 26b of the lever 26 is disengaged from the contact ring 22 of the displaceable shaft 21 so that the gear 25 fixed to the displaceable shaft 21 is brought into engagement with the coupling gear 7. Thus, when the plate 8 reaches the end of its movement the plate 9 is started to be rotated in the reverse direction so that the change-over of the driving direction is effected in a highly accurate manner.

As described above, the specific mechanisms according to the present invention are provided with a driving power transmitting arrangement utilizing a ball-slip coupling. Upon completion of winding film of predetermined length, transmission of driving power in a film winding direction is stopped by slip operation of said slip coupling arrangement, while on the other hand driving power in the reverse direction is transmitted due to change in the state or condition of the coupling arrangement, and thus positively relaxes the camera components from the tension due to film winding drive operation. This assures accurate shutter release operation which is to be subsequently effected. During this shutter release operation the film winding arrangement is not in operation, providing the camera shutter release components with sufficient time for accomplishing their operation. The shutter release operation and subsequent film winding operation for the next photographing cycle can be automatically carried out in a sequential manner. Since the conventional cam coupling arrangement is not utilized, the structure, machining and assembling operations can be readily and inexpensively achieved.

While there have been described and illustrated preferred embodiments of the present invention, it is apparent that numerous alterations, omissions and additions may be made without departing from the spirit thereof.

What is claimed is:

1. A film advancing mechanism comprising a rotatable film take-up member, a drive member, means including a slip clutch coupling said drive member to said take-up member and means responsive to the condition of said slip clutch for relieving the torque on said take-up member and comprising an overrunning clutch shiftable between a drive and a slip condition and connected between said take-up member and said slip clutch and including a drive section coupled to said slip clutch and rotatable in an advancing direction by said drive member through said slip clutch, and means responsive to the condition of said slip clutch for rotating said overrunning clutch drive section in a reverse direction.

2. The film advancing mechanism of claim 1 wherein said slip clutch comprises relatively axially movable rotatable drive and driven members spring urged into mutual engagement and means for axially separating said slip clutch drive and driven member in response to relative rotation between said slip clutch members, said overrunning clutch reverse driving means being operable upon said separation of said slip clutch members.

3. The film advancing mechanism of claim 1 wherein said overrunning clutch drive means comprises a gear transmission alternatively shiftable into and out of coupling engagement between said drive shaft and said overrunning clutch drive member in response to the condition of slip clutch.

4. The film advancing mechanism of claim 1 including a shutter release member responsive to the shifting of said slip clutch.

5. The film advancing mechanism of claim 1 including a motor connected to said drive shaft means including a switch movable between open and closed position connecting said motor to a source of current and means for urging said switch to an open position upon the shifting of said slip clutch to a slip condition.

6. A film advancing mechanism comprising a rotatable film take-up member, a drive member, means including a slip clutch coupling said drive member to said take-up member and means responsive to the condition of said slip clutch for relieving the torque on said take-up member and comprising means responsive to the condition of said slip clutch for uncoupling the take-up member from said drive member, said uncoupling means comprising an overrunning clutch connected between said take-up member and said slip clutch and including a drive section coupled to said slip clutch, and means responsive to the condition of said slip clutch for rotating said overrunning clutch drive section in a reverse direction.

7. A film advancing mechanism comprising a rotatable film take-up member, a drive member, means including a slip clutch coupling said drive member to said take-up member and means responsive to the condition of said slip clutch for relieving the torque on said take-up member, said slip clutch comprising relatively axially movable and rotatable drive and driven members spring urged toward each other and having recesses formed in the confronting faces thereof, and a coupling ball in releasable registry with said recesses whereby relative rotation of said clutch members effects the axial separation thereof, said torque relieving means being responsive to said axial separation.

References Cited

UNITED STATES PATENTS

| | | | |
|---|---|---|---|
| 2,673,041 | 3/1954 | Hittel | 242—55.12 |
| 2,927,790 | 2/1957 | Tyler et al. | 95—31 |
| 3,126,805 | 3/1964 | Schroder et al. | 95—31 |
| 3,250,139 | 5/1966 | Madsen | 74—404 |
| 3,268,748 | 8/1966 | Bucheister et al. | 74—404 |
| 3,385,189 | 5/1968 | Hennig et al. | 95—31 |

NORTON ANSHER, *Primary Examiner.*

R. A. SCHROEDER, *Assistant Examiner.*

U.S. Cl. X.R.

242—71.6